United States Patent [19]
Skala

[11] 3,790,279
[45] Feb. 5, 1974

[54] OIL CONTAMINATION MONITOR WITH DIGITAL SIGNAL PROCESSING

[75] Inventor: George Frank Skala, Scotia, N.Y.

[73] Assignee: Environment/One Corporation, Schenectady, N.Y.

[22] Filed: Sept. 28, 1971

[21] Appl. No.: 184,477

[52] U.S. Cl............... 356/70, 235/151.35, 250/218, 356/104, 356/205, 356/206
[51] Int. Cl....................... G01n 33/28, G01n 21/26
[58] Field of Search. 356/70, 96, 97, 103, 104, 201, 356/204–206, 209–212; 235/151.35; 250/218

[56] References Cited
UNITED STATES PATENTS

| | | | |
|---|---|---|---|
| 2,852,693 | 9/1958 | Hughes et al. | 356/70 X |
| 3,578,865 | 5/1971 | Traver | 356/70 |
| 3,552,863 | 1/1971 | Smith | 356/206 |
| 3,633,012 | 1/1972 | Wilhelmson et al. | 356/201 X |
| 3,528,749 | 9/1970 | Bewker | 356/206 X |
| 3,562,795 | 2/1971 | Frenk | 356/206 X |

OTHER PUBLICATIONS

Wright: The Review of Scientific Instruments, Vol. 28, No. 2, February 1957, pages 129–134.

Primary Examiner—Ronald L. Wibert
Assistant Examiner—F. L. Evans
Attorney, Agent, or Firm—Charles W. Helzer

[57] ABSTRACT

The circuit for digitally processing the analog signals from an oil contamination monitor includes analog to digital converters, digital accumulators for accumulating the thus converted signals over a predetermined period of time and digital comparators, preferably dividers for forming ratios of the thus accumulated digital signals to produce a comparison output. When a single analog signal corresponding to the light scattering effect a reference material and the oil to be monitored have upon light is to be processed, gate means first separates the analog signal corresponding to only the light scattering effect of the oil and a second analog signal corresponding only to the light scattering effect of the reference material; and when a single analog electrical signal corresponding to the light attenuation effect the reference material and oil have upon light is to be processed, gate means separates the single signal into a first analog signal corresponding only to the light attenuation effect of the oil and a second analog signal corresponding only to the light attenuation affect of the reference material. Each of the thus separated analog signals is processed by an analog to digital converter whose output is accumulated over a predetermined period of time and fed to a respective one of two digital dividers, with the first digital having an output corresponding to the ratio of the light scattering effect of the oil and the light scattering effect of the reference, and the second digital divider having an output corresponding to the light transmission effect of the oil and the light transmission effect of the reference material. The ratio output of the first digital divider is fed directly to the digital analyzer while the ratio output of the second digital divider, corresponding to light transmission, is first fed to a digital subtractor where it is subtracted from a predetermined higher digital standard corresponding to complete light transmission so as to produce an attenuation ratio output that is fed directly to the digital analyzer. The digital analyzer may give representative values to the amount of contamination within the oil or the chemical breakdown or the like of the oil, or have warning lights as to excessive contamination or oil breakdown.

17 Claims, 2 Drawing Figures

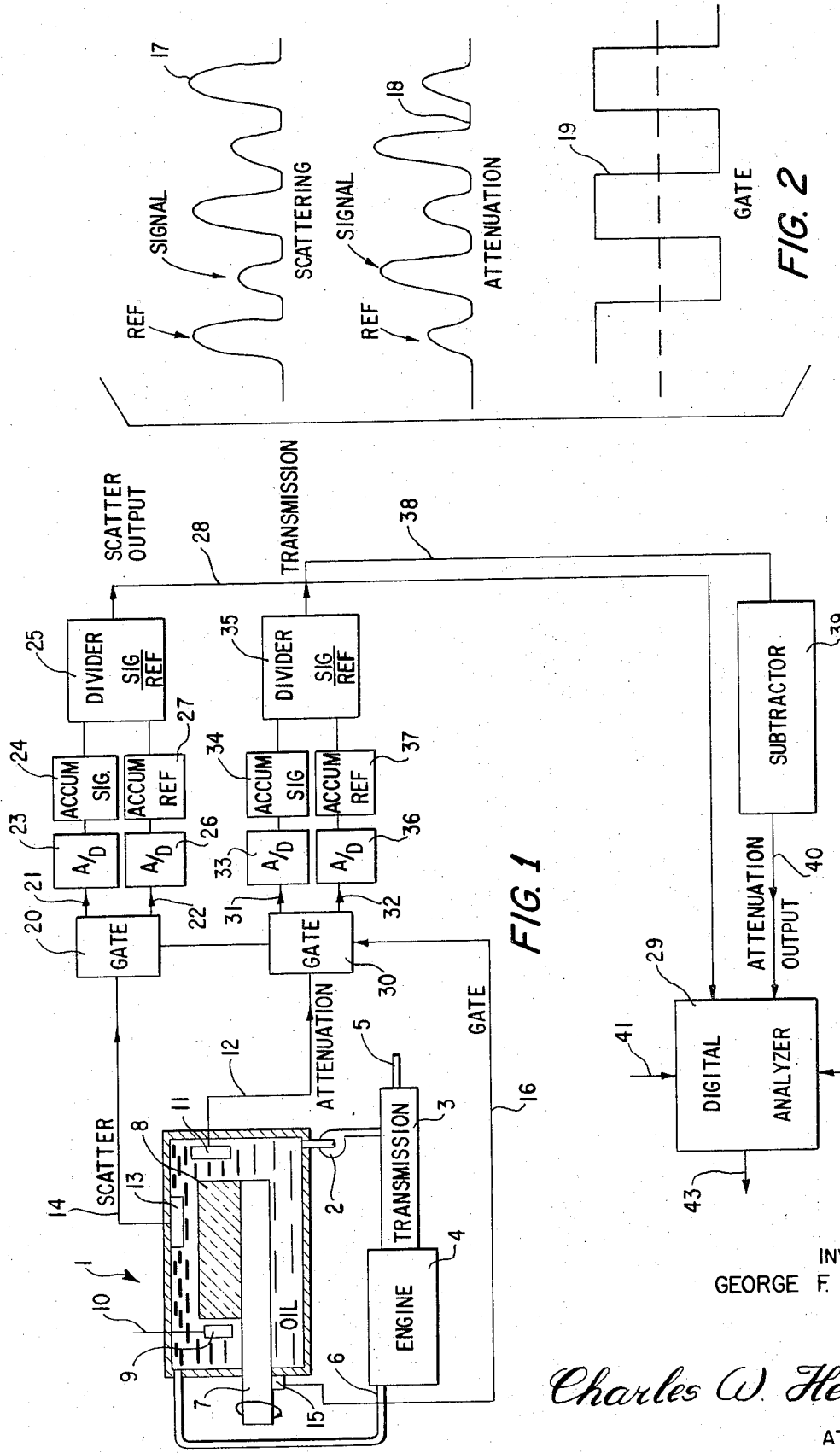

OIL CONTAMINATION MONITOR WITH DIGITAL SIGNAL PROCESSING

BACKGROUND OF THE INVENTION

The present invention relates to a combination of an optical fluid contamination monitor of a type disclosed in the patent applications of George F. Skala, "Dual Beam Fluid Monitor," Ser. No. 31,995, filed Apr. 27, 1970; George F. Skala, "Optical Fluid Contamination and Change Monitor Method and Apparatus," Ser. No. 65,410, filed Aug. 20, 1970; and George F. Skala, "Optical Fluid Contamination and Change Monitor," Ser. No. 847,675, filed Aug. 5, 1969, all of which applications are assigned to the assignee of the present invention. The digital processing circuit of the present invention is usable in place of the analog processing circuits of the above-mentioned applications and further may be used in combination with other types of monitors or the like. The disclosures of the above-identified applications are incorporated herein in their entirety by reference.

In the analog processing circuit of the above-identified applications, reliability or accuracy has been obtained to a satisfactory extent by regulating the light source of the optical monitor or regulating the various amplifiers used in the processing circuit according to feedbacks correlated to the difference between reference signals and standard signal generators. Without these rather expensive and complicated feedback controls, reliability and accuracy would be greatly sacrificed as the various optical surfaces become unevenly coated with contamination, the light responsive transducers and light source means change with age, and various other operating errors begin to have a material effect.

SUMMARY OF THE INVENTION

The digital processing circuit of the present invention is in the above-identified overall combination of an oil or like fluid contamination or change monitor. Oil is a necessary element in lubrication or power transmission for various prime movers, such as an engine-transmission combination of an airplane. During use, the oil becomes contaminated with various metallic particles, chemically breaks down, and generally becomes dirty due to carbon from combustion being suspended therein, for example. It is desirable to accurately monitor this contamination and the oil changes, and it has been found that the affect the oil has upon light, by scattering and attenuation when compared with the scattering and attenuation affect of a reference material only may be used for this monitoring purpose. The electrical signals from such an optical monitor would be analog in form and may comprise a combined scattering signal for oil and reference material, and a combined attenuation signal for oil and reference material, or four separate signals for oil scattering, reference material scattering, oil attenuation, and reference material attenuation.

The digital processing circuit of the present invention provides gate means, in the nature of those described in the above-mentioned applications for separating signals when they are received in combined form. Four separate analog digital converters are respectively associated to convert the four separate analog signals corresponding to oil scattering, reference scattering, oil attenuation, and reference attenuation to a digital form for subsequent digital processing. Four separate digital accumulators respectively accumulate the four digital signals received from the four converters over a period of time and periodically produce accumulated digital outputs. A comparator, preferably a digital divider, will compare the accumulated oil scattering signals with the accumulated reference scattering signals, while a separate comparator, preferably a digital divider, will compare the oil attenuation signals with the reference attenuation signals to correspondingly produce two outputs, which would preferably be digital ratios. The digital ratio for attenuation produced by the corresponding digital divider, would in effect be related to transmission, and this transmission ratio is therefore subtracted from a larger digital standard in a digital subtractor so that the difference may be fed along with the scattering ratio to a digital analyzer that may use the information, along with other information, as desired. Since digital signals are being compared, preferably being divided, the various errors mentioned above will not have corresponding affects upon the information received by the analyzer in the manner it would have with respect to the above-identified analog circuits. Thus, no special feedback correcting provisions are necessary for the desired accuracy and reliability.

BRIEF DESCRIPTION OF THE DRAWING

Further objects, features and advantages of the present invention will become more clear from the following description of the drawing, wherein:

FIG. 1 schematically illustrates the entire combination of the digital processing circuit according to the present invention with the optical oil monitor that feeds it information on the contamination and change of the oil being circulated in a closed circuit through a prime mover; and FIG. 2 shows the electrical form of the various analog signals as they are transmitted by the optical fluid monitor to the processing circuit.

DETAILED DESCRIPTION OF THE DRAWING

As shown in FIG. 1, the optical oil contamination and change monitor 1, which is more fully described in the above-identified applications, is in combination with an oil pump 2, which pumps lubricating or power transmission oil through a transmission 3 and engine 4 in a closed circuit. As an example, the engine 4 may drive the transmission 3 having an output 5 for driving the propeller of an airplane. The engine may be a reciprocating piston internal combustion engine, a jet engine, or any other type requiring oil circulating for operation. The oil from the engine 4 is returned by a line 6 to the optical monitor 1, from which it is again drawn by the pump 2. By way of brief description, the optical monitor 1 employs a rotatable shaft 7, which has eccentrically mounted thereon a reference material 8, which may be a rod of Lucite or like optical material constructed to simulate the light scattering and light attenuation qualities of clean oil. In the position shown, a light source, such as a light emitting diode, is mounted in the monitor so as to project a beam of light through the reference material when energized by electric current flowing through lead line 10. The light from source 9 will pass through the reference material 8 and strike the light responsive transducer 11 that will produce an analog electrical signal in line 12 corresponding to the light attenuation of the reference material 8. Further, a light responsive transducer 13 is positioned within the monitor 1 so as to receive light scattered by the reference material 8 for producing an analog electrical signal in line 14 that corresponds to the scattering effect of the reference material 8.

When the shaft 7 is rotated through 180° from its illustrated position about its axis, which in FIG. 1 would be horizontal, the light from source 9 will pass entirely through oil in reaching light responsive transducer 11 and will pass through and be scattered entirely by oil in reaching the light responsive transducer 13. The shaft 7 may be driven by an electric motor or through turbine blades (not shown) reacting with the oil flowing from line 6 through the oil monitor 1 to the pump 2. With this rotation of the shaft 7, it is seen that the signals produced by the light responsive transducers 11 and 13, will each alternate between those correlated to the affect the reference material has upon the light and the affect the oil has upon the light.

For determining when an oil signal has been transmitted instead of a reference material signal, for example, means 15 will feed a suitable signal through line 16. By way of illustration, a magnetic pickup 15 will cooperate with magnetic and non-magnetic portions of the shaft 7 to produce a signal in line 16 that will alternate with the same frequency as the signals in lines 12 and 14, and be correlated to the position of the reference material 8 with respect to the stationarily mounted transducers 9, 13 and 11.

As shown in FIG. 2, the analog electrical signal carried in line 14 has a waveform 17 that consists of alternating relatively large reference pulses and relatively small signal pulses. The height of the reference pulses will be correlated to the scattering affect of the reference material and the height of the signal pulses will be correlated to the scattering affect of the oil. While the reference material may be selected to duplicate the effect clean oil would have in scattering the light, it may also be chosen to produce some arbitrary higher scattering standard signal. The frequency of alternating between reference and signal pulses for the waveform 17 will exactly correspond to the frequency of rotation for the shaft 7. In a similar manner, the waveform 18 for the attenuation analog electrical signal in line 12 is shown in FIG. 2 to alternate between relatively small reference material pulses (REF) and relatively large signal or oil attenuation pulses. Again, the frequency of alternating between reference and signal or oil is identical to the frequency of rotation for the shaft 7 and the waveform 17. The analog signal produced in line 16 is preferably a square waveform 19 as shown in FIG. 2 and has the same frequency as the waveforms 17 and 18, with a positive value corresponding in time with the presence of a reference pulse in the waveforms 17 and 18 and a negative value corresponding in time with the presence of a signal or oil pulse in the waveforms 17, 18.

The gate 20 of FIG. 1 will separate the analog electrical signal in line 14 into two separate signals respectively fed to lines 21 and 22. The signal in line 21 will include all of the signal pulses of waveform 17 and the signal in line 22 will include all of the reference pulses of waveform 17. Various types of gates 20 may be employed and controlled by the waveform 19 carried in line 16, and preferably field-affect transistors are employed as mor fully set forth in the above-identified applications.

The signal in line 21 of analog signal pulses passes through the analog to digital converter 23 to be changed into digital form and fed to the signal accumulator 24. Various digital systems may be employed, but preferably a binary system is employed with the present invention. As a result, the accumulator would store the peak amplitudes as binary bits. In a similar manner, the signal in line 22 containing the analog reference pulses of waveform 17 is fed through the analog digital converter 26 and converted to a digital form received by the reference accumulator 27, which will store the peak amplitudes as binary bits. Periodically, accumulated digital signals will be sent by the accumulators 24 and 27 to the digital comparator 25, which is preferably a digital divider.

The comparator 25 will produce an output correlated to the specific comparison of the signal or oil scattering affect to the reference material scattering affect, and specifically for the digital divider produce an output that is the ratio of the accumulated binary bits of the signal or oil scattering affect to the accumulated binary bits of the reference material scattering affect. This ratio output is fed through line 28 to a digital analyzer 29, which would be described in more detail hereinafter.

In a similar manner, the gate 30, which is preferably identical to the gate 20, will separate the analog electrical signal of waveform 18 into an analog electrical signal carried by line 31 containing the signal pulses of waveform 18 and into an analog electrical signal carried by line 32 containing the reference pulses of waveform 18. As above, the analog digital converter 33 will convert the signal in line 31 to a digital form where it will be accumulated by the digital accumulator 24 and periodically fed to the comparator or more specifically digital divider 35. In a like manner, the analog signal carried by line 32 will become converted to digital form by the analog digital converter 36 and accumulated as binary bits in the binary accumulator 37 to be fed periodically to the divider 35. The comparison output of the comparator 35 will be passed to line 38 and more specifically with respect to the digital divider will be in the form of a ratio of the signal or oil accumulated binary bits to the reference material accumulated binary bits. The signal in line 38 will more correctly by a measure of the transmission rather than attenuation of the light through the oil so that it is fed to a subtractor 39 wherein it is subtracted from a higher digital standard representing 100 percent transmission, so that the output of subtractor 39 will be fed to line 40 and be a true attenuation output, leading to the digital analyzer 29. The digital analyzer 29 will receive other digital information from lines 41 and 42, for example, for scanning or the like processing to produce an output 43. The output 43 may be in the form of warning lights, digital recorders, combinations thereof or the like to provide a visual or audible indication of oil contamination or other adverse change. The digital material fed by line 41 may, for example, be engine heat while the digital material fed by line 42 may correspond to fuel level so that the output 43 may include a warning signal, either audible or visual, if something is wrong with the engine so that suitable separate digital recorders may be viewed to find the exact source of trouble.

As mentioned previously, the gates 20 and 30, and the gate signal source 15 are more fully described in the above-identified applications. The analog digital converters 23, 26, 33, 36, may be of any conventional form, and are more fully described in the second edition of "Electronic Computer Technology," by Norman R. Scott, McGraw-Hill Publishing Company, 1970, pages 581 - 588. The digital storage devices or accumulators 24, 27, 34, and 37, may be of many different types, for example such as those shown in "Digital Logic and Computer Operations," by Robert C. Baron and Albert T. Piccirilli, McGraw-Hill Publishing Company, 1967, pages 93–100. Although various types of digital comparators may be used, it is most desirable to use digital dividers, which may be of the type disclosed in the above-cited "Digital Logic and Computer Operations," pages 24 and 167–172. The subtractor 39 may be of the type disclosed in the above-identified "Digital Logic and Computer Operations," pages 21 and 142–156. The digital analyzer may be of any type that would produce visual and audible signals and recorded data.

The optical monitor 1 is preferably of the type disclosed in the above-identified applications, although it is contemplated that the digital circuitry of the present invention may be used with a modified optical monitor having one set of light source 9, scattering transducer 13 and attenuation transducer 11, for the reference material and a separate set of light source 9, scattering transducer 13 and attenuation transducer 11 for the oil so that lines 21, 22, 31, 32, would be directly connected to their respective transducers and the gates 20 and 30 as well as the gate signal producing means 15 would be eliminated. However, it is most desirable to employ the embodiments specifically shown in the drawing wherein only two transducers and their single light source are employed, to produce more uniform results. Light emitting diodes (LED) are well known in the art and therefore will not be described in detail except to mention that they produce a uniform beam of light over an extremely long period of time, as compared to filament type of light sources, which makes them particularly useful in the monitor of the present invention.

Also, various digital systems, with different base numbers, may be employed and accordingly in some cases, the accumulators 24, 27, 34, 37, may be eliminated. However, it is most desirable to employ a binary systems with the accumulators.

OPERATION

During the operation of the engine 4 and transmission 3, lubricating or other type of oil whose contamination and change is desired to be monitored, is passed in a closed circuit by pump 2 through the transmission 3, engine 4, line 6, and optical monitor 1 back to the pump 2. The shaft 7 is either externally driven or driven by turbine blades (not shown) reacting with the oil passing through the monitor, so that alternately oil and the reference optical material 8 will be optically between the light source 9 and light responsive transducers 11, 13.

With reference material 8 in the position as shown in FIG. 1, light will travel through the reference material and be attenuated so that the transducer 11 will produce an electrical signal in line 12 corresponding to the amount of light transmitted through the reference material 8, which signal will be in pulsed from having a frequency equal to the frequency of revolution of the shaft 7. When the reference material is not in the indicated position of FIG. 1 upon rotation of the shaft 7, the light from source 9 will be picked up by transducer 11 after being attenuated by the oil therebetween so as to produce a pulsed signal in line 12 of the same frequency of the rotation of the shaft 7. It is thus seen, that the total signal in line 12 will have pulses as indicated in waveform 18 of FIG. 2 that will alternate between reference material pulses and oil or signal pulses. The signal in line 12 will be separated by the gate 30, under the influence of the gating signal 19 of FIG. 2 in line 16, so as to produce only the reference material pulses in line 32 and only the signal or oil pulses in line 31. Thereafter, these pulses are changed from their analog form to a suitable digital form by the converters 33, 36, respectively, and subsequently accumulated as binary bits in the accumulators 34, 37, respectively, so as to be fed periodically to the divider 35, which produces in line 38, a signal that is the ratio of the oil or signal accumulated binary bits to the reference material accumulated binary bits. This signal in line 38 is, as mentioned before, in reality a measure of the transmission of the light through the oil as related to the standard reference material and is fed to the subtractor 39, which subtracts the digital signal from a value corresponding to 100 percent transmission, so that the output in line 40 is in reality a measure of the attenuation produced by the oil as compared to the reference material.

Similarly, the scattering light responsive transducer 13 will pick up light that has been scattered by the reference material, in the position of FIG. 1, to produce a pulsed signal in line 14, which has a frequency equal to the frequency of revolution for the shaft 7. When the shaft 7 is rotated 180° from its position shown in FIG. 1, only oil will be between the light source and transducers so that the transducer 13 will pick up light from the light source 9 that has been scattered by the oil only, so as to produce a signal in line 14 containing pulses with a frequency equal to the frequency of revolution of the shaft 7. Thus, the signal in line 14 will alternate between oil scattering pulses and reference material scattering pulses, to have a waveform as shown at 17 in FIG. 2. As in the case of attenuation, the gate 20, in cooperation with gating signal source 15 will separate the signal in line 14 so as to produce only signal or oil scattering pulses in line 21 to be fed through the analog digital converter 23, the accumulator 24 and to the divider 25, whereas the line 22 will contain only the reference scattering pulses to be fed through the analog digital converter 26, the accumulator 27 and divider 25. Divider 25 will produce an output in line 28 that is the ratio of the accumulated binary bits derived from the signal pulses to the accumulated binary bits derived from the reference pulses, which output in line 28 is finally fed with the output in line 40 to the digital analyzer 29, where it is used to perform desired functions such as operate warning lights, registers, recorders, and the like. With the use of such digital circuitry, the problem of filtering out background signals is eliminated and there is no need for feedback devices to control amplification or power to the light source to compensate for various error factors such as light source change, dirtying of optical surfaces and the like.

While a single preferred embodiment has been specifically illustrated and described, along with various modifications, further modifications, variations and embodiments are contemplated within the spirit and scope of the invention as defined by the following claims.

What it claimed is:

1. An oil monitor to be operatively connected within the closed oil circuit of a power plant, comprising: a receptacle for receiving the oil as it passes through the closed circuit; a standard light conducting reference means for affecting light as to attenuation and scattering in a manner correlated to the effect substantially clean and unused oil has upon light; light source means and light responsive transducer means for passing light through, and receiving scattered and attenuated light from both the oil within said receptacle and said reference means for producing a first analog electrical signal having alternating pulses correlated to the light scattering effect the oil had upon the light and the light scattering effect the reference means had upon the light, and a second analog electrical signal having alternating pulses corresponding to the light attenuation effect the oil had upon the light and the light attenuation effect the reference had upon the light; gate means for separating said first analog electrical signal into an oil scattering analog electrical signal and a separate reference scattering analog electrical signal; and gate means for separating said second analog electrical signal into an oil attenuation analog electrical signal and a separate reference attenuation analog electrical signal; means for converting each of said oil scattering analog electrical signal, reference scattering analog electrical signal, oil attenuation analog electrical signal, and reference attenuation analog electrical signal respectively from their analog form to a digital oil scattering electrical signal, a digital reference scattering electrical signal, a digital oil attenuation electrical signal, and a digital reference attenuation electrical signal; separate digital accumulators respectively receiving each of said digital electrical signals and having periodic accumulated digital output signals; first means receiving the accumulated digital reference scattering electrical signal and the accumulated digital oil scattering electrical signal, and having an electrical output correlated to the ratio of said accumulated digital oil scattering electrical signal to said accumulated digital reference scattering electrical signal; and separate second means receiving the accumulated digital oil attenuation electrical signal and the accumulated digital reference attenuation electrical signal, and having an electrical output correlated to the ratio of said accumulated digital oil attenuation electrical signal to said accumulated digital reference attenuation electrical signal.

2. An oil monitor according to claim 1, including a power plant requiring oil lubrication, and means for circulating lubricating oil in a closed circuit through said power plant and said receptacle.

3. The oil monitor of claim 1, including third means receiving the output of said second means and producing a digital output of the difference between a predetermined digital standard corresponding to complete transmission of light from said light source means to said light responsive transducer means and the output of said second means, which third means output will increase with increased attenuation.

4. An oil monitor according to claim 1, including a prime mover requiring operating oil and having a rotary output; a transmission having an input drivingly connected to said prime mover output, a rotary power output, and requiring operating oil; means, including a pump, circulating oil in a closed circuit through said receptacle and at least one of said prime mover and transmission.

5. An electrical circuit for processing an analog electrical signal from a fluid contamination monitor, wherein the signal alternates between an electrical pulse corresponding to the effect the fluid to be monitored has upon a beam of light and an electrical pulse correlated to the effect a reference material has upon a corresponding beam of light, comprising: gate means for separating the reference and fluid electrical signals into a first analog electrical signal containing only the electrical pulses correlated to the effect the fluid has upon the beam of light and a separate second analog electrical signal containing only the electrical pulses correlated to the effect the reference material has upon a corresponding beam of light; first analog to digital converter means receiving said first electrical signal as an input and producing a corresponding digital output; second analog to digital converter means receiving said second electrical signal as an input and producing a corresponding digital output; and digital divider means in circuit with said analog to digital converters for producing an output corresponding to the ratio of said first and second digital outputs.

6. The circuit of claim 5, including digital signal accumulator means in circuit to receive the digital output from said first analog to digital converter means for producing an accumulator output connected to the input of said digital divider means and corresponding to the accumulated signals over a predetermined period of time; and second digital signal accumulator means in circuit to receive the digital output from said second analog to digital converter means for producing an accumulator output connected to the input of said digital divider means and corresponding to the accumulated converter outputs over a predetermined period of time.

7. The circuit of claim 5 as a first processing circuit for handling signals corresponding to the scattering effect the fluid and reference material have upon light; and further including in combinations a parallel second processing circuit for handling an analog electrical signal from the fluid contamination monitor corresponding alternately to the attenuation effect the reference material and fluid have upon the beam of light, which second processing circuit is identical to said first processing circuit.

8. The processing circuits of claim 7, including digital subtractor means having an input connected to the output of the digital divider means of said second processing circuit for producing a digital attenuation output corresponding to the difference between a digital standard of complete light transmission and the output of the digital divider means of said second processing circuit.

9. An electrical circuit for processing the signals to be received from a fluid contamination monitor, wherein a first analog electrical signal is correlated to the effect the fluid has upon a beam of light and a second analog electrical signal is correlated to the effect a reference material has on a corresponding beam of light, comprising: first analog to digital converter means for receiving the first analog electrical signal as an input and producing a corresponding first digital output; and second analog to digital converter means for receiving the second analog electrical signal as an input and producing a corresponding second digital output; and digital divider means producing a ratio of the first and second outputs as a single comparison digital electrical output, which would correspond to the condition of the fluid being monitored.

10. The circuit of claim 9, including separate digital accumulator means respectively accumulating the first and second digital outputs of said first and second analog to digital converters over a predetermined period of time and producing corresponding periodic accumulated outputs to be fed as inputs to said digital divider means.

11. The circuit of claim 9, as a first processing circuit for handling the first and second analog electrical signals corresponding respectively to the scattering effect fluid and reference material have upon light; and further including in combination a parallel second processing circuit for handling third and fourth analog electrical signals from the fluid contamination monitor corresponding respectively to the attenuation effect fluid and reference material have upon light; said second processing circuit being identical to said first processing circuit.

12. The processing circuit combination of claim 11, including separate digital accumulator means respectively accumulating the first and second digital outputs of said first and second analog to digital converters over a predetermined period of time and producing corresponding periodic accumulated outputs to be fed as inputs to said digital divider means separately for each of said first and second processing circuits.

13. The processing circuit combination of claim 12, including digital subtractor means having an input connected to the output of the digital divider means of said second processing circuit for producing a digital attenuation output corresponding to the difference between a digital standard of complete light transmission and the output of the digital divider means of said second processing circuit; and digital analyzer means directly receiving the output of said first processing circuit digital divider means and said second processing circuit digital subtractor means.

14. The processing circuit combination of claim 13, in combination with an optical oil monitor having means for holding oil and reference material, light source means for passing beams of light through the reference material and the oil, and light responsive means for receiving the light that has passed through the oil and receiving the light that has passed through the reference material for respectively producing the first, second, third and fourth analog electrical signals to be processed by said first processing circuit and said second processing circuit.

15. The processing circuit combination of claim 14, including prime mover means requiring oil circulation, and means for circulating oil in a closed circuit through said prime mover means and said means for holding oil of said optical oil monitor.

16. A method of monitoring oil contamination, comprising the steps of: circulating operating oil to a power plant in a closed circuit, passing light through the oil in the closed circuit and a reference material; producing a first analog electrical signal correlated to the attenuation effect the reference material has upon the light; producing a second analog electrical signal correlated to the attenuation effect the oil has upon the light; producing a third analog electrical signal correlated to the scattering effect the reference material has upon the light; producing a fourth analog electrical signal correlated to the scattering effect the oil has upon the light; converting each of said first, second, third and fourth analog electrical signals into corresponding separate first, second, third and fourth digital electrical signals; separately accumulating each of said first, second, third and fourth digital electrical signals over a predetermined period of time; dividing the thus accumulated oil scattering digital signals by the thus accumulated reference scattering digital signals; and dividing the thus accumulated oil attenuation digital signals by the thus accumulated reference attenuation digital signals.

17. The method of claim 16, including the step of subtracting the ratio of oil attenuation to reference attenuation accumulated signals from a substantially larger standard digital signal corresponding to complete transmission of light.

* * * * *